United States Patent [19]
Wright

[11] Patent Number: 5,490,662
[45] Date of Patent: Feb. 13, 1996

[54] GARAGE-DOOR SPRING REINFORCEMENT AND REPAIR KIT

[76] Inventor: Michael A. Wright, 141 Main St., Exxex Junction, Vt. 05452

[21] Appl. No.: 412,463

[22] Filed: Mar. 29, 1995

[51] Int. Cl.⁶ ............................................. F16B 1/00
[52] U.S. Cl. ........................... 267/74; 267/182; 403/213
[58] Field of Search ................................. 403/209, 213, 403/291; 49/200, 322; 267/74, 170, 174, 180, 182

[56] References Cited

U.S. PATENT DOCUMENTS

| | | | |
|---|---|---|---|
| 3,272,496 | 9/1966 | Halopoff et al. | 267/74 |
| 3,718,325 | 2/1973 | Nystrom | 267/74 |
| 3,958,367 | 5/1976 | Fairman | 49/197 |
| 4,076,433 | 2/1978 | Halopoff | 403/213 |
| 4,472,910 | 9/1984 | Iha | 49/200 |
| 4,640,049 | 2/1987 | Duncan | 49/197 |
| 4,731,905 | 3/1988 | Milano et al. | 49/200 |
| 4,757,853 | 7/1988 | Price | 160/191 |
| 4,824,276 | 4/1989 | Ginell | 403/213 |
| 4,852,378 | 8/1989 | Greco | 72/379 |
| 5,004,216 | 4/1991 | Boudreau | 267/179 |

OTHER PUBLICATIONS

Henry Martin "Adjustable Extension Springs" in Douglas C. Greenwood, Ed. Product Engineering Design Manual (McGraw Hill Book Company, Inc. New York, 1959) pp. 320–321.

Federico Strasser "29 Ways to Fasten Springs" New Ideas and Data for Product Design Improvements in Product Engineering (McGraw—Hill Publication, New York, 1960) pp. 10–13.

Primary Examiner—Robert J. Oberleitner
Assistant Examiner—Chris Schwartz
Attorney, Agent, or Firm—Theodore R. Touw

[57] ABSTRACT

The invention is a kit of parts to be retrofitted to a type of garage-door spring that functions in extension and may break near its retention hook, which may be an integral hook formed by bending of the spring material itself. The kit of this invention improves safety by reducing the chance of the spring-retention hooks' breaking. The kit has two major parts which are easily assembled together and attached to an existing spring without the use of tools. A disk-shaped centering clement contacts the spring coils at least at three positions on its rim, thereby distributing stress over a significantly larger area than the conventional integral retention hooks. The disk has an aperture, a notch, and a flat. A hook element fits through the notch and aperture, and a dogleg portion of the hook element extends beyond the disk's rim contacting the spring's end to help prevent the spring from turning. For reinforcing a normal garage door installation, four spring reinforcement and repair kits arc required (two for each spring). The kit is also used for repair of springs that have broken at or near their integral hooks, without requiring replacement of the entire spring. The safety of a garage-door spring installation is further improved by including in the garage-door spring reinforcement and repair kit an auxiliary spring of smaller coil diameter and substantially weaker spring constant than the garage-door spring itself. The auxiliary spring has a relaxed length shorter than the garage-door spring and an outer coil diameter small enough to fit entirely within the inner coil diameter of the garage-door spring. If the garage-door spring should break within the spring coil, the auxiliary spring retains the broken spring parts. The auxiliary spring is attached by integral hooks or by use of spring reinforcement and repair kits made small enough to fit within the inside diameter of the garage-door spring coil itself.

14 Claims, 3 Drawing Sheets

GARAGE-DOOR SPRING REINFORCEMENT AND REPAIR KIT

FIELD OF THE INVENTION

This invention relates to apparatus for reinforcing and repairing garage-door springs. More particularly, it relates to a kit for repairing broken garage-door coil springs and for reinforcing attachment means of existing garage-door springs to prevent breakage.

BACKGROUND OF THE INVENTION

Many existing garage doors have springs installed that function in extension to counterbalance the weight of the garage door. Such springs normally have integral retention hooks formed by bending of the spring material itself, and such springs often break at or near those hooks. While replacement springs are commercially available, they are relatively expensive compared to the cost of a repair kit that can make use of the remaining portion of a garage-door spring that has broken near one end. Thus there is a need for inexpensive and easy-to-install repair kits for extension garage-door springs. Since breakage &garage-door springs is so common as to justify marketing of replacement springs, another related need is a reinforcement for the end-attachments of conventional extension garage-door springs to prevent their breakage and thus to improve consumer safety.

DESCRIPTION OF THE RELATED ART

U.S. Pat. No. 3,718,325 by Nystrom discloses a repair clamp adapter for a helical spring. The adapter is made up of a plug having an external spiral groove defined by a spiral ridge, and the plug has an eye bolt threadably attached to it. U.S. Pat. No. 3,958,367 by Fairman discloses a safety device including a flexible wire rope extending longitudinally through the elongated spring with ends beyond the spring ends, one end mounted adjacent to a fixed end of the spring, and the other end mounted adjacent to the other end of the spring. U.S. Pat. No. 4,640,049 by Duncan discloses a safety device for overhead garage-door springs which includes a cable extending through the open center of the coil spring, and the cable is adjustably anchored at each end to the garage structure in sufficient tension to contain the spring against substantial horizontal or vertical movement in the event of breakage. U.S. Pat. No. 4,757,853 by Price discloses a safety device for an overhead garage door which includes an elongated flexible member (wire rope) extending longitudinally through each of the coil springs and secured to fixed supports at its ends. Each end of each spring is secured to its supports through a surrounding tubular member with an end cap. U.S. Pat. No. 4,852,378 by Greco discloses a spring retainer for an overhead garage-door mechanism. The retainer is stamped and formed from sheet steel by notching out triangular shapes from the centers of four sides of a square, punching a central hole, forming a cylindrical shape around the hole, and completing a cylindrical shape by bending four radial arms together to close the previously stamped triangular notches. In use, the central hole fits on a shaft and the retainer is attached to a garage-door spring. U.S. Pat. No. 5,004,216 by Boudreau discloses a spring connection assembly for children's bouncing toys that use support springs. The spring connection assembly has an elongated support member, an eyelet mounted to the support member, an end hook formed on the coil spring, and a clip portion. The clip portion extends parallel to the hook formed on the end of the spring, but in the opposite direction, and has a base portion retained within the end of the spring.

The book "Product Engineering Design Manual," Douglas C. Greenwood, Ed. (McGraw-Hill 1959), at pages 320–321 describes a wide variety of methods for attaching an end of a helical extension spring, tested to reduce risk of breakage. Other methods of attaching extension springs are illustrated in "New Ideas and Data for Product Design Improvements," in "Product Engineering" (McGraw-Hill Publication, 1960) "29 Ways to Fasten Springs" at pages 10–13.

OBJECTS AND ADVANTAGES OF THE INVENTION

A major object of the invention is improved safety of garage-door springs. A related major object of this invention is a safety reinforcement and repair kit for a garage-door spring of the type used to counterbalance the weight of a garage door by tension in an extended coil spring. Another object is a garage-door spring safety reinforcement and repair kit with a rigid hook element for fastening one end of a garage-door spring to a fixed support, either as a reinforcement to prevent breakage or as a replacement for a broken end after the garage-door spring has broken. A related object is a rigid hook clement that can be easily assembled to a garage-door spring by a consumer without tools. Another object is a kit that is easily disassembled by a consumer without tools. Another object of the invention is a kit that is assembled without a threaded joint, thereby avoiding the relatively thin contact area provided by threads. Another object of the invention is a kit of parts which, when assembled with an existing garage-door spring, has an attachment that is stronger than that of a conventional spring Another object of the invention is a kit of parts that can be used to repair (without purchasing a replacement spring) a garage-door spring broken near its end. Another object is a garage-door spring safety reinforcement and repair kit which contacts the garage-door spring at three or more points to better distribute stress. Another object is a garage-door spring safety reinforcement and repair kit which prevents the garage-door spring from turning. Another object is a garage-door spring safety reinforcement and repair kit which cannot be disconnected from the garage-door spring to which it is attached by accidental rotation of the spring. Another object of the invention is a repair kit including a hook that is easily aligned or automatically aligned with the coil axis of the garage-door spring. Another object is a repair kit which does not need to be made to match the wire size or coil pitch of any particular garage-door spring. Another safety-related object of the invention is a kit including an additional spring to be installed inside the conventional garage-door spring to prevent violent motions of the conventional spring's broken parts and to hold any broken coil segments should the garage-door spring break after the safety reinforcement and repair kit is installed. An object related to the latter is an additional spring with a spring constant less than that of the garage-door spring. These and other objects and advantages of the invention will be apparent from a reading of the following specification together with the drawings and the appended claims.

SUMMARY OF THE INVENTION

The invention is a kit of parts to be retrofitted to a type of garage-door spring that functions in extension and may break near its retention hook, which may be an integral hook formed by bending of the spring material itself. The kit of this invention improves safety by reducing the chance of the spring-retention hooks' breaking. The kit has two major parts which are easily assembled together and attached to an existing spring, without the use of tools. A disk-shaped centering element contacts the spring coils at least at three positions on its rim, thereby distributing stress over a significantly larger area than the conventional integral retention hooks. The disk has an aperture, a notch, and a flat. A hook element fits through the notch and aperture, and a dogleg portion of the hook element extends beyond the disk's rim, contacting the spring's end to help prevent the spring from turning. For reinforcing a normal garage door installation, four spring reinforcement and repair kits are required (two for each spring). The kit is also used for repair of springs that have broken at or near their integral hooks, without requiring replacement of the entire spring.

The safety of a garage-door spring installation is further improved by including in the garage-door spring reinforcement and repair kit an auxiliary spring of smaller coil diameter and substantially weaker spring constant than the garage-door spring itself. The auxiliary spring has a relaxed length shorter than the garage-door spring and an outer coil diameter small enough to fit entirely within the inner coil diameter of the garage-door spring. If the garage-door spring should break within the spring coil, the auxiliary spring retains the broken spring parts. The auxiliary spring is attached by integral hooks or by use of spring reinforcement and repair kits made small enough to fit within the inside diameter of the garage-door spring coil itself.

DETAILED DESCRIPTION OF THE PREFERRED EMBODIMENTS

Figure 1:
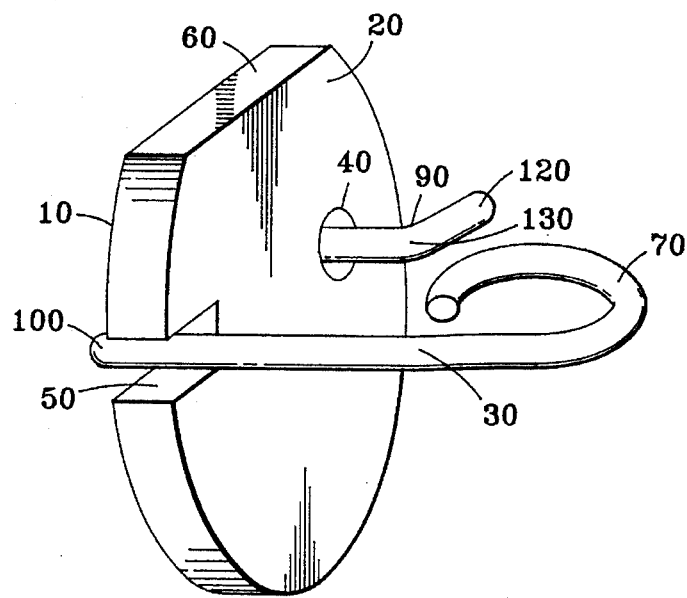
FIG. 1 shows a perspective view of an assembled embodiment of a garage-door spring reinforcement and repair kit made in accordance with the invention.
Figure 2:
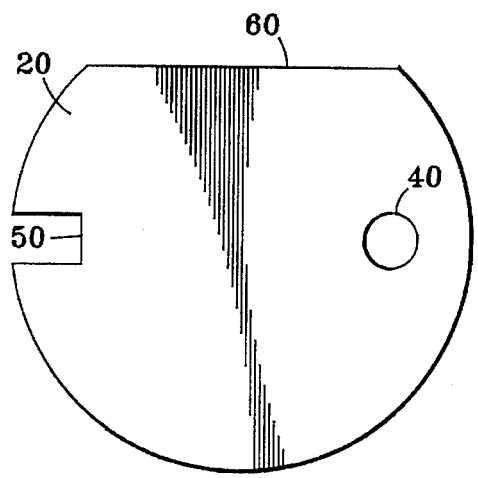
FIG. 2 shows a plan view of a disk element of the embodiment of FIG. 1.

The garage-door spring reinforcement mid repair kit is assembled from discrete parts, without tools. FIG. 1 shows a perspective view of an assembled embodiment of the kit 10, which has a rigid disk element 20 and a hook element 30. Disk element 20 has an aperture 40 extending through the disk and a slot 50 extending inward front the disk's rim. Hook element 30 passes through aperture 40 and slot 50. Disk element 20 also has a flat portion 60 on its rim, preferably oriented as shown in FIGS. 1 and 2. The exact orientation of flat portion 60 relative to aperture 40 and slot 50 is not critical to operation of the invention. Flat portion 60 is made large enough to accommodate a single wire diameter of the garage-door coil spring, thus providing for centering of the spring reinforcement and repair kit. When the reinforcement and repair kit is in use with a garage-door spring, the spring wire passes along flat portion 60. Disk element 20 is preferably made by machining rigid flat steel stock, for example. In alternative embodiments disk element 20 could be stamped from sheet metal stock. In tile latter method, disk element 20 may be stamped with a raised rim surrounding a dished central portion, and other conventional rib-like structures may be stamped to enhance the rigidity of disk element 20, as is known in the art and therefore not illustrated in the drawings.

Figure 3:
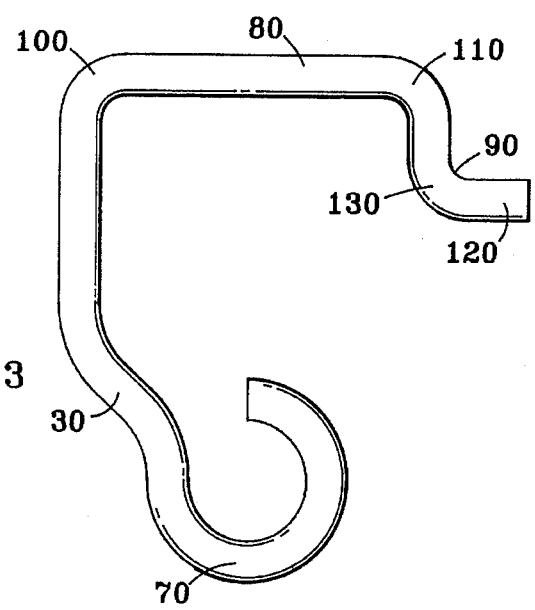
FIG. 3 shows a plan view of a hook element of the embodiment of FIG. 1.
Figure 4:
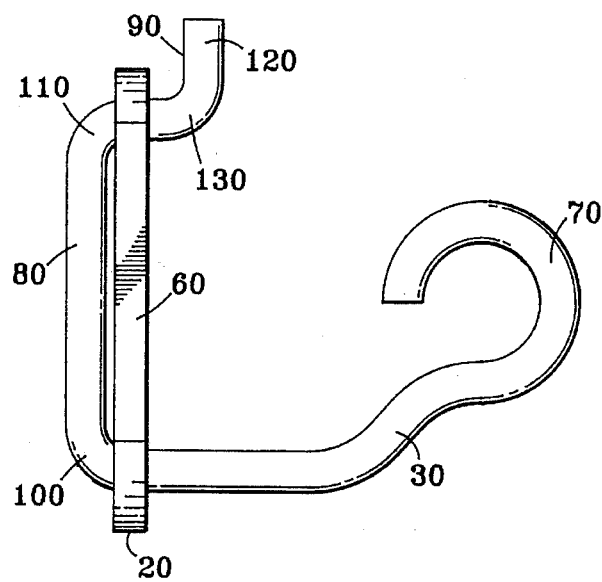
FIG. 4 shows a side view of the assembled embodiment of FIG. 1.

Hook element 30, as shown in FIGS. 1 and 3, has a hook portion 70, a retaining portion 80, and a dogleg portion 90. In the embodiment illustrated in FIG. 1 and 3, retaining portion 80 is a straight rod-shaped portion extending generally between two bights 100 and 110 (at aperture 40 and slot 50 respectively) and resting in contact with disk element 20. Hook portion 70 is more or less centered on the axis of disk element 20 when assembled as in FIG. 1, and preferably curls in the direction shown. The direction that hook portion 70 curls is not critical to the invention; the opposite direction or some other direction will also work satisfactorily. The dogleg portion 90 extends radially outward, with a straight salient extension 120 extending beyond the rim of disk clement 20 from a bight 130. FIG. 4 shows a side view of the assembled embodiment of FIG. 1. Hook element 30 may be made by hot forming steel red of about ⅜ inch diameter, for example.

Figure 5:
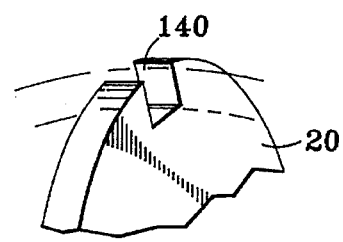
FIG. 5 shows a partial perspective view of an alternate embodiment of a garage-door spring reinforcement and repair kit.

FIG. 5 shows a cutaway partial perspective view of an alternate embodiment of a garage-door spring reinforcement and repair kit. The embodiment illustrated in FIG. 5 has, in place of flat portion 60, a single second slot 140 cut at a suitable angle to disk element 20 and cut to a suitable depth to accommodate a single coil wire of the garage-door spring.

Figure 6:
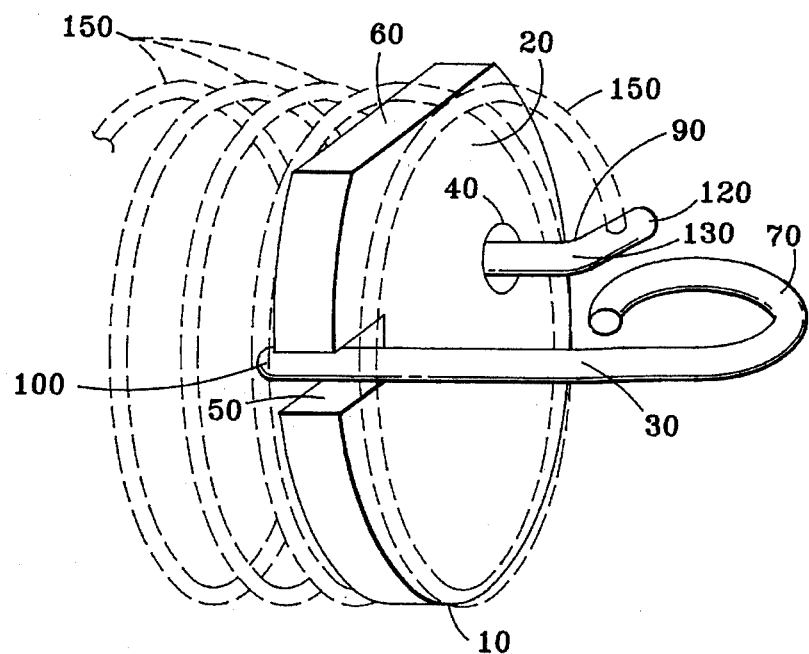
FIG. 6 shows a perspective view of a garage-door spring reinforcement and repair kit as assembled with an existing garage-door spring.

FIG. 6 shows a perspective view of a garage-door spring reinforcement and repair kit as assembled with an existing garage-door spring 150. When assembled as shown with the garage-door spring, flat portion 60 of disk element 20 allows a turn of the coil spring to pass, and allows the kit to be centered on the coil spring's axis. The straight salient extension portion 120 of dogleg 90 of hook element 30 prevents the spring 150 from turning.

Figure 7:
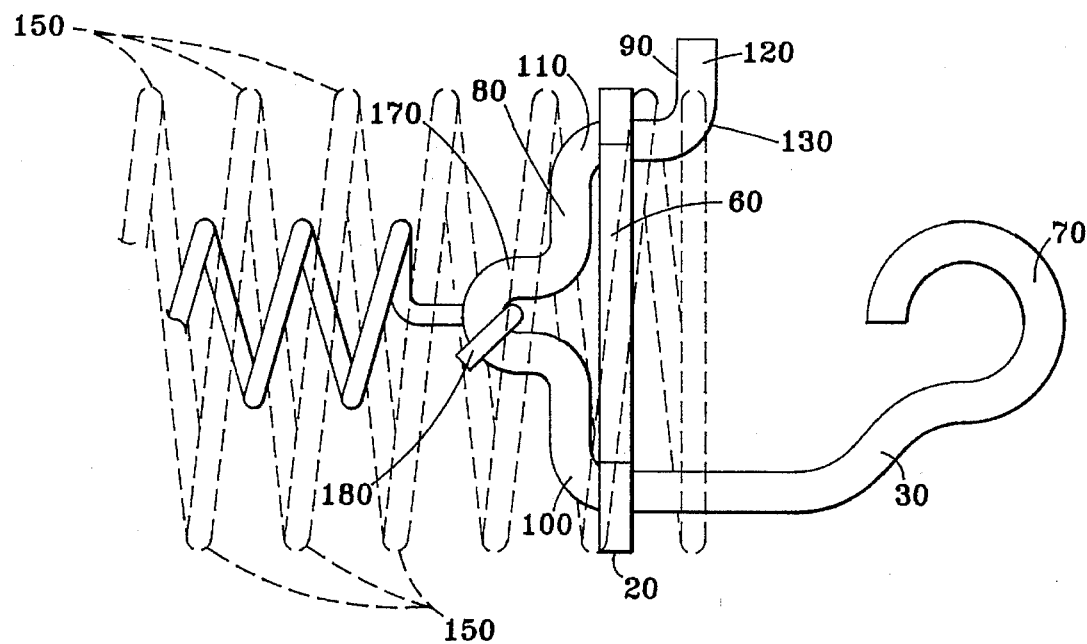
FIG. 7 shows a detail of an embodiment of a garage-door spring reinforcement and repair kit.
Figure 8:
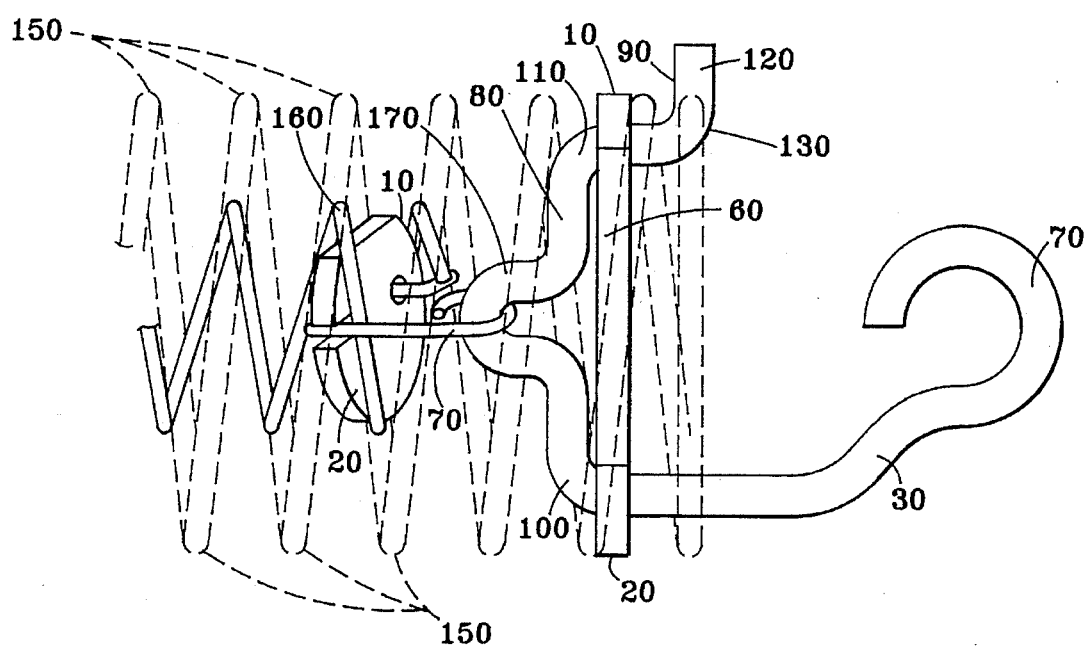
FIG. 8 shows a detail of another embodiment of a garage-door spring reinforcement and repair kit.

The safety of a garage-door spring installation may be further improved as shown in FIG. 7 by including in the garage-door spring reinforcement and repair kit an auxiliary spring 160 of smaller diameter and substantially weaker spring constant than the garage-door spring itself. Auxiliary spring 160 has a relaxed length shorter than the garage-door spring, an outer diameter small enough to fit entirely within the inner diameter of the garage-door spring, and a weak spring constant. If the garage-door spring 150 itself should break, the auxiliary spring 160 can retain major broken sections and moderate any violent motion of the broken spring. FIG. 7 shows a detail illustrating a modified hook element, provided with a bend 170 for attachment of the weaker and smaller diameter auxiliary spring 160. Auxiliary spring 160 may be attached by an integral hook 180 as shown in FIG. 7, but is preferably attached by use of spring reinforcement and repair kits smaller than (but otherwise similar to) those designed to fit the garage-door spring 150 itself as illustrated in FIGS. 1–6. In an alternative method of attaching auxiliary spring 160, rigid disk 20 may have a mounting hole (not shown) for attachment using integral hook 180 or using the smaller-size kit mentioned above. The invention may also be used with a safety cable as described above in the description of related art, instead of or in addition to the auxiliary spring 160. It will be apparent that the invention may be used for extension coil springs other than those used for garage doors.

Other embodiments of the invention, with various changes and modifications of the invention to adapt it to various usages and conditions, will be apparent to those skilled in the art from a consideration of this specification or from practice of the invention disclosed herein. For example the hook portion may be attached to the disk portion using a different retaining portion, such as a flange or nut, and the salient extension may be formed from a separate piece. It is intended that the specification and examples be considered as exemplary only, with the true scope and spirit of the invention being defined by the following claims.

Having described my invention, I claim:

1. A safety reinforcement and repair kit for a garage-door spring having first and second spring ends, a wire diameter, a coil axis, a coil inner diameter, and a relaxed length, and being characterized by a spring constant, comprising:

a) a rigid hook element having first and second cads, said first end having a hook for fastening one of said first and second garage-door spring ends to a fixed support, and said second end having a retaining portion, and b) a rigid disk having a thickness, a center, and a rim defining a disk diameter, said disk diameter being larger than the garage-door spring inner diameter, said disk having an aperture through which said hook element is inserted, said disk having a slot extending inwardly from said rim sufficiently to removably engage said retaining portion of said hook element for preventing rotation of said hook element, and said rim of said disk having a flat portion disposed for contacting a wire diameter of the garage-door spring when said disk is inserted into one of said first and second garage-door spring ends to attach said hook to a fixed support.

2. A safety reinforcement and repair kit as recited in claim 1, wherein said aperture is located between said center and said rim of said rigid disk.

3. A safety reinforcement and repair kit as recited in claim 1, wherein said hook is adapted to be oriented ill a plane parallel to said garage-door spring coil axis.

4. A safety reinforcement and repair kit as recited in claim 1, wherein said retaining portion of said rigid hook element has a substantially rectangular U-shape, having a base portion extending between first and second bights characterized by substantially right angles.

5. A safety reinforcement and repair kit as recited in claim 4, wherein said first bight connects said base portion of said retaining portion to said first end of said rigid hook element.

6. A safety reinforcement and repair kit as recited in claim 4, wherein said second bight connects said base portion of said retaining portion to a dogleg portion characterized by an axial portion extending through said disk, by a third bight, and by a salient extension portion extending from said third bight radially outward beyond said rim, to prevent said garage-door spring from turning.

7. A safety reinforcement and repair kit as recited in claim 4, wherein said base portion extends between said aperture in said rigid disk and said slot of said rigid disk.

8. A safety reinforcement and repair kit as recited in claim 4, wherein said retaining portion is oriented in the plane of said hook.

9. A safety reinforcement and repair kit as recited in claim 1, further comprising:

an auxiliary coil spring characterized by an auxiliary spring constant smaller than the garage-door spring constant, having an outer coil diameter smaller than the garage-door spring coil inner diameter having a relaxed length smaller than the garage-door spring relaxed length, and having first and second auxiliary spring ends, said auxiliary coil spring being attachable at said first auxiliary spring end to said hook element retaining portion and attachable at said second auxiliary, spring end to a remote one of said first and second garage-door spring ends, to hold any broken coil segments should said garage-door spring break after said safety reinforcement and repair kit is installed.

10. A safety reinforcement and repair kit as recited in claim 9, wherein said auxiliary spring is attached to said hook element by an integral hook formed at said first auxiliary spring end.

11. A safety reinforcement and repair kit as recited in claim 9, wherein said hook element retaining portion further comprises a bend formed for attaching said auxiliary spring.

12. A safety reinforcement and repair kit as recited in claim 1, further comprising:

an auxiliary coil spring characterized by an auxiliary spring constant smaller than the garage-door spring constant, having an outer coil diameter smaller than the garage-door spring coil inner diameter, having a relaxed length smaller than the garage-door spring relaxed length, and having first and second auxiliary spring ends, said auxiliary coil spring being attachable at said first auxiliary spring end to said rigid disk and attachable at said second auxiliary spring end to a remote one of said first and second garage-door spring ends, to hold any broken coil segments should said garage-door spring break after said safety reinforcement and repair kit is installed.

13. A safety reinforcement and repair kit for a garage-door extension spring having first and second spring ends, a wire diameter, a coil axis, a coil inner diameter, and a relaxed length, and being characterized by a first spring constant, comprising:

(a) a rigid first hook element having first and second ends, said first end having a first hook adapted for fastening one of said first and second garage-door spring ends to a fixed support, said second end having a retaining portion, and said retaining portion including a bend;

(b) a rigid first disk having a thickness, a center, and a first rim defining a first disk diameter, said first disk diameter being larger than the garage-door spring inner diameter, said first disk having an aperture through which said first hook element is inserted, said first disk having a slot extending inwardly from said first rim sufficiently to removably engage said retaining portion of said first hook element for preventing rotation of said first hook element, and said first rim of said first disk having a first flat portion adapted for contacting a wire diameter of the garage-door spring when said first disk is inserted into one of said first and second garage-door spring ends to attach said first hook to a fixed support;

(c) an auxiliary coil spring characterized by an auxiliary spring constant smaller than said first spring constant of the garage-door spring, having an outer coil diameter smaller than the garage-door spring coil inner diameter, having a relaxed length smaller than the garage-door spring relaxed length, and having first and second auxiliary spring ends; and (d) an auxiliary reinforcement kit made small enough to fit within said garage-door spring coil inner diameter, said auxiliary reinforcement kit comprising:

(i) a rigid second hook element having first and second ends, said first end having a second hook for fastening one of said first and second auxiliary spring ends to said bend of said retaining portion of said first hook element;

(ii) a rigid second disk having a thickness, a center, and a second rim defining a second disk diameter, said second disk diameter being larger than the auxiliary spring inner diameter, said second disk having a second aperture through which said rigid second hook element is inserted, said second disk having a second slot extending inwardly from said second rim sufficiently to removably engage said retaining portion of said second hook element for preventing rotation of said second hook element and said second rim of said second disk having a second flat portion adapted for contacting a wire diameter of the auxiliary spring when said second disk is inserted into one of said first and second auxiliary spring ends and said auxiliary spring is extended in tension to attach said second hook to said bend of said retaining portion of said first hook element;

whereby said auxiliary coil spring is attachable at said first auxiliary spring end to said first hook element retaining portion using said auxiliary reinforcement kit, and attachable at said second auxiliary spring end to a remote one of said first and second garage-door spring ends, to hold any broken coil segments should said garage-door spring break after said safety reinforcement and repair kit is installed.

14. A safety reinforcement and repair kit for a garage-door spring having first and second spring ends, a wire diameter, a coil axis, a coil inner diameter, and a relaxed length, and being characterized by a spring constant, comprising:

a) a rigid hook element having first and second ends, said first end having a hook for fastening one of said first and second garage-door spring ends to a fixed support, and said second end having a retaining portion having a substantially rectangular U-shape and having a base portion extending between first and second bights, wherein said first bight connects said base portion of said retaining portion to said first end of said rigid hook element and said second bight connects said base portion of said retaining portion to a dogleg portion characterized by an axial portion, by a third bight, and by a salient extension portion extending from said third bight radially outward to prevent said garage-door spring from turning, b) a rigid disk having a thickness, a center, and a rim defining a disk diameter, said disk diameter being larger than the garage-door spring inner diameter, said disk having an aperture through which said hook element is inserted, said disk having a slot extending inwardly from said rim sufficiently to removably engage said retaining portion of said hook element for preventing rotation of said hook element, said rim of said disk having a flat portion disposed for contacting a wire diameter of the garage-door spring when said disk is inserted into one of said first and second garage-door spring ends to attach said hook to a fixed support, and c) an auxiliary coil spring characterized by an auxiliary spring constant smaller than the garage-door spring constant, having an outer coil diameter smaller than the garage-door spring coil inner diameter, having a relaxed length smaller than the garage-door spring relaxed length, and having first and second auxiliary spring ends, said auxiliary, coil spring being attachable at said first auxiliary, spring end to said hook element retaining portion and attachable at said second auxiliary spring end to a remote one of said first and second garage-door spring ends, to hold any broken coil segments should said garage-door spring break after said safety reinforcement and repair kit is installed.

* * * * *

UNITED STATES PATENT AND TRADEMARK OFFICE
CERTIFICATE OF CORRECTION

PATENT NO : 5,490,662

DATED : February 13, 1996

INVENTOR(S) : Michael A. Wright

It is certified that error appears in the above-identified patent and that said Letters Patent is hereby corrected as shown below:

Title page at [76], "Exxex" should be -- Essex --.

Column 1, line 24, "&garage-door" should be -- of garage-door --.

Column 2, line 35, "spring" should be -- spring. --.

Column 3, line 58, "mid" should be -- and --.

Column 4, line 9, "tile" should be -- the --.

Column 5 line 21, "cads" should be -- ends --.

Column 5, line 43, "ill" should be -- in --.

Column 6, line 4, "diameter" should be -- diameter, --.

Column 6, line 10, "auxiliary, spring" should be -- auxiliary spring --.

Column 8, line 31, "auxiliary, coil" should be -- auxiliary coil --.

Column 8, line 32, "auxiliary, spring" should be -- auxiliary spring --.

Signed and Sealed this

First Day of December, 1998

Attest:

BRUCE LEHMAN

*Attesting Officer*  *Commissioner of Patents and Trademarks*